United States Patent [19]
Fliegelman, deceased et al.

[11] 4,081,116
[45] Mar. 28, 1978

[54] GAFF HOOK HOLDER

[76] Inventors: Ronald Fliegelman, deceased, late of Bronx, N.Y.; by Helen Fliegelman, administratrix, 2745 Gifford Ave., Bronx, N.Y. 10465

[21] Appl. No.: 738,786
[22] Filed: Nov. 3, 1976
[51] Int. Cl.² .............................................. A45F 5/00
[52] U.S. Cl. .................. 224/5 A; 224/26 B; 43/57.5 R
[58] Field of Search .................. 224/2 D, 3, 5 R, 5 A, 224/5 J, 7 D, 26 R, 26 B; 43/5, 43.2, 54.5 R, 57.5 R

[56] References Cited
U.S. PATENT DOCUMENTS

| 1,413,290 | 4/1922 | O'Leary | 224/5 A |
| 1,750,891 | 3/1930 | Jungemann | 224/5 A |
| 2,165,708 | 7/1939 | Jend | 43/57.5 R |
| 2,932,118 | 4/1960 | Jend | 43/57.5 R |

Primary Examiner—Albert J. Makay
Attorney, Agent, or Firm—Allison C. Collard

[57] ABSTRACT

A gaff hook holder for receiving the hook portion of a gaff hook consisting of a housing having a semicircular chamber with a diameter slightly larger than the periphery of the gaff hook. The chamber also has a thickness slightly larger than the thickness of the gaff hook. There is a detent formed in the chamber adjacent to its walls and reducing the thickness of the chamber so that when the hook is inserted into the chamber, it psses over the detent and snaps into place within the chamber. The holder preferably is constructed of a flat plate and a formed plate containing the chamber, both of which are riveted together and have belt loops formed on the sides for receiving the strap or belt.

3 Claims, 4 Drawing Figures

GAFF HOOK HOLDER

This invention relates to a portable gaff hook holder particularly suitable for sportsmen.

More specifically, this invention relates to a gaff hook holder which can be connected to a belt or other strap for easy handling and convenience.

In sporting affairs such as during fishing where a gaff hook is used, problems arise with properly storing or carrying the hook so that its sharp point will not cause injury to persons or damage to equipment. Particularly in fishing fresh water streams, it is difficult to conveniently carry a gaff hook and have it readily available when needed.

Accordingly, the present invention provides a gaff hook holder having belt loops which permit the holder to be attached to the blet of the user, and is capable of retaining the gaff hook until it is ready for use. The device of the invention includes a receiving chamber having a shape approximately equal to the outer periphery of the gaff hook, and a detent formed near the top of the chamber so that the hook can be snapped into the chamber and retained by the detent until it is ready for use.

It is therefore an object according to the present invention to provide a gaff hook holder having belt loops which is capable of retaining a gaff hook until it is ready for use.

It is another object according to the present invention to provide a gaff hook holder which is simple in design, easy to construct and reliable in operation.

Other objects and features of the present invention will become apparent from the following detailed description considered in connection with the accompanying drawing which shows the embodiment of the invention. It is to be understood that the drawing is designed for the purpose of illustration only and not as a definition of the limits of the invention.

In the drawing, wherein similar reference characters denote similar elements throughout the several views.

Figure 1:
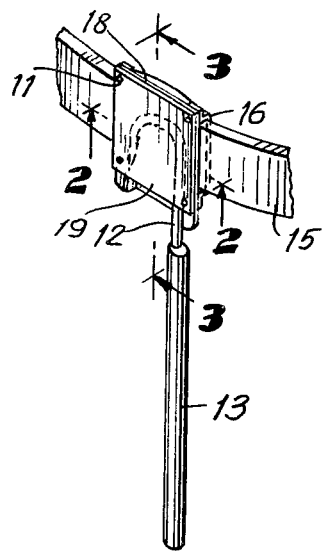
FIG. 1 is a perspective view showing the gaff hook inserted into the gaff hook holder of the subject invention.

Referring to FIGS. 1-4, there is shown the gaff hook holder 10 constructed of a rigid material such as metal and having a flat front plate 19 which is riveted to a pair of spaced apart belt loops 16 by means of rivets 11. Between front plate 19 and back plate 18 is formed a semicircular chamber 17 which preferably takes the shape of the outer periphery of gaff hook 12. The semicircular compartment is formed into the metal surface of plate 18 before the belt loops are riveted through this plate and front plate 19. Adjacent to the top of the semicircular compartment and spaced approximately the thickness of the diameter of gaff hook 12 is a detent 14 formed in the surface of plate 18. The detent is bent inward toward the surface of plate 19. The separation between plates 18 and 19 within semicircular chamber 17 is slightly larger than the diameter of the gaff hook to permit the gaff hook to be slid easily into the chamber. Detent 14 however, is bent inward within chamber 17 a sufficient amount so as to form a separation between plates 18 and 19 at the point of detent which is less than the diameter of the gaff hook. Thus, when the gaff hook is inserted into chamber 17 and approaches detent 14, it is necessary for the user to push the gaff hook beyond the detent so that the flexability of plate 18 will permit the detent to ride over the rounded surface of gaff hook 12 before it settles against the peripheral walls of chamber 17 as shown in detail in FIGS. 3 and 4.

Figure 2:
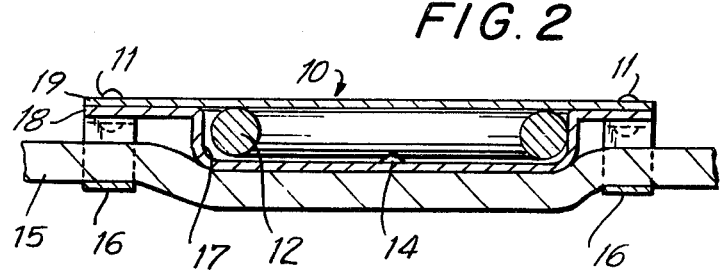
FIG. 2 is a cross sectional view taken through Section 2—2 of FIG. 1.
Figure 3:
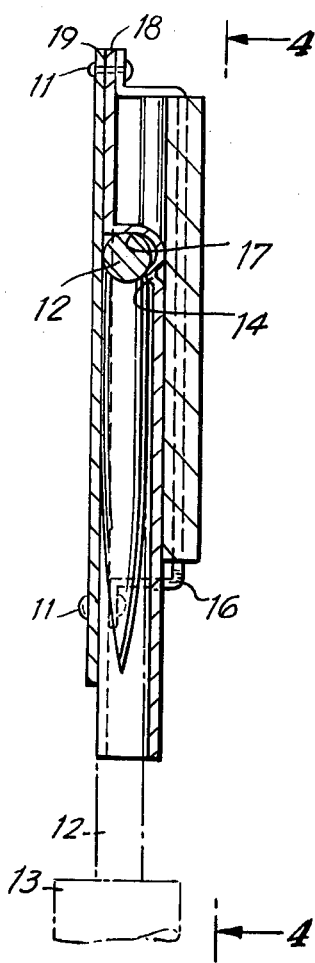
FIG. 3 is a cross sectional view taken through Section 3—3 of FIG. 1.
Figure 4:
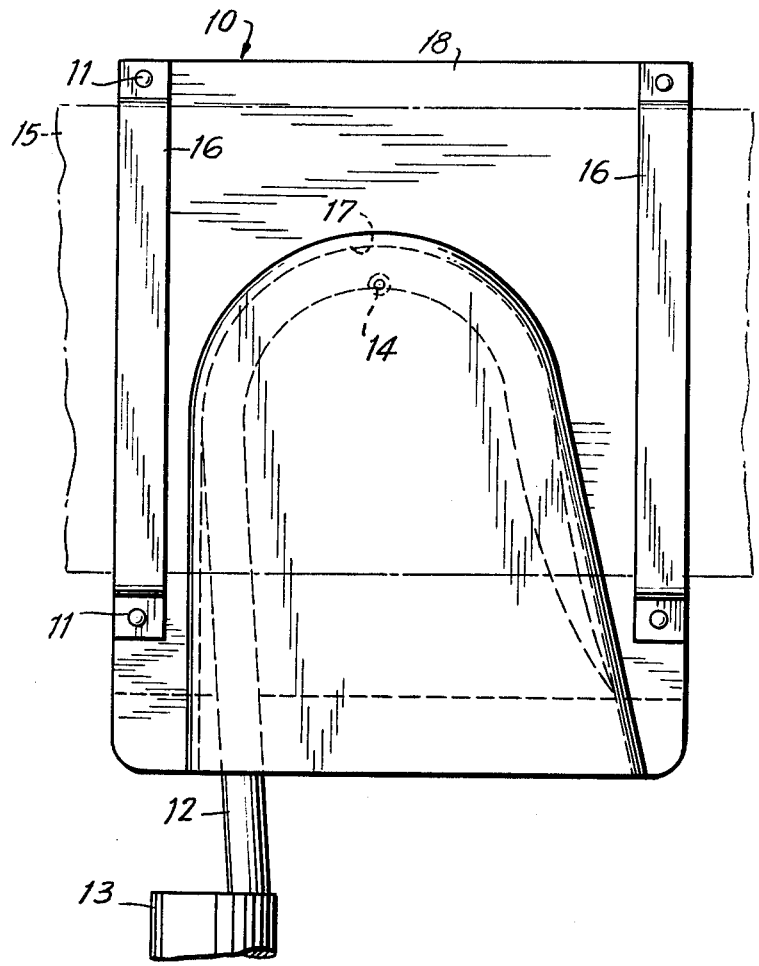
FIG. 4 is a cross sectional view taken through Section 4—4 of FIG. 3.

The gaff hook preferably has a handle 13 in its construction. Belt loops 16 are preferably made sufficiently wide to accept most standard belts 15 as shown in FIGS. 1, 2 and 4. Belt loops 16 which are parallel and spaced apart on each side of the gaff hook holding device are secured in place by means of rivets 11 formed in each end. Rivets 11 also secure plates 18 and 19 together when the holder is assembled.

The plates of the holder and the belt loops are preferably constructed of metal such as stainless steel to prevent corrosion. The device can also be made of fiberglass, plastic, or any other rigid material which can withstand the normal use of the insertion and removal of the gaff hook.

While only a single embodiment of the present invention has been shown and described, it will be obvious that many changes and modifications may be made thereunto without departing from the spirit and scope of the invention.

What is claimed is:

1. A gaff hook holder for receiving the hook portion of a gaff hook comprising:

a substantially flat housing comprising a first flat plate and a second chamber plate having a semicircular chamber formed therein for receiving the hook portion of the gaff hook, the diameter of said semicircular chamber being slightly larger than the outer periphery of the hook, the width of the chamber being slightly greater than the thickness of the hook;

detent means formed within said chamber for reducing the thickness of the chamber with respect to the gaff hook so that upon insertion of the gaff hook into the chamber it passes over the detent for securement in place against the semicircular walls of the chamber housing;

belt loops which are parallel and spaced apart and formed on the sides of the holder for receiving a belt or strap; and means for securing the flat plate, said second plate having the semicircular chamber, and said belt loops together.

2. The holder as recited in claim 1 wherein said securing means comprises rivets passed through each of said plates and the ends of said belt loops.

3. The holder as recited in claim 2 wherein said detent means comprises at least one dimple formed in said chamber plate.

* * * * *